United States Patent [19]

Gonsalves et al.

[11] 4,037,667
[45] July 26, 1977

[54] BLOWER FOR EDGER

[76] Inventors: Michael Gonsalves, 2586 Nodal Ave., Castro Valley, Calif. 94546; Constante C. Sarmiento, 33947-13th St., Union City, Calif. 94587

[21] Appl. No.: 643,400

[22] Filed: Dec. 22, 1975

[51] Int. Cl.² .................. A01D 35/00; A01G 3/06
[52] U.S. Cl. ........................... 172/14; 56/12.2; 137/615; 181/36 E; 239/594
[58] Field of Search ............... 172/13, 14, 15; 56/12.2, 12.8, 13.3; 181/36 B, 36 E, 42; 239/592, 594; 137/615

[56] References Cited

U.S. PATENT DOCUMENTS

| 829,609 | 8/1906 | Steinke | 137/615 X |
|---|---|---|---|
| 1,452,779 | 4/1923 | Barry | 137/615 |
| 1,496,635 | 6/1924 | Higley | 239/594 |
| 1,510,761 | 10/1924 | Burman | 137/615 |
| 1,878,424 | 9/1932 | Oloberg | 181/42 X |
| 2,026,743 | 1/1936 | Kurtz | 239/594 |
| 2,586,145 | 2/1952 | Breuer et al. | 239/592 |
| 2,727,534 | 12/1955 | Briede | 137/615 |
| 3,852,944 | 12/1974 | Zuercher | 172/15 X |
| Re. 26,351 | 2/1968 | Sheiry | 137/615 |

*Primary Examiner*—Paul E. Shapiro
*Attorney, Agent, or Firm*—Bielen and Peterson

[57] ABSTRACT

A blower apparatus for a plant cutter including a hollow member affixed to conduct exhaust gases from the cutter. The hollow member conducts exhaust gases from the plant cutter to a connected rotatable hollow member and through a terminal opening in the rotatable hollow member. The rotatable hollow member adjusts the distance between the terminal opening and the cut vegetable resulting from the cutting mechanism of the lawn cutter.

7 Claims, 5 Drawing Figures

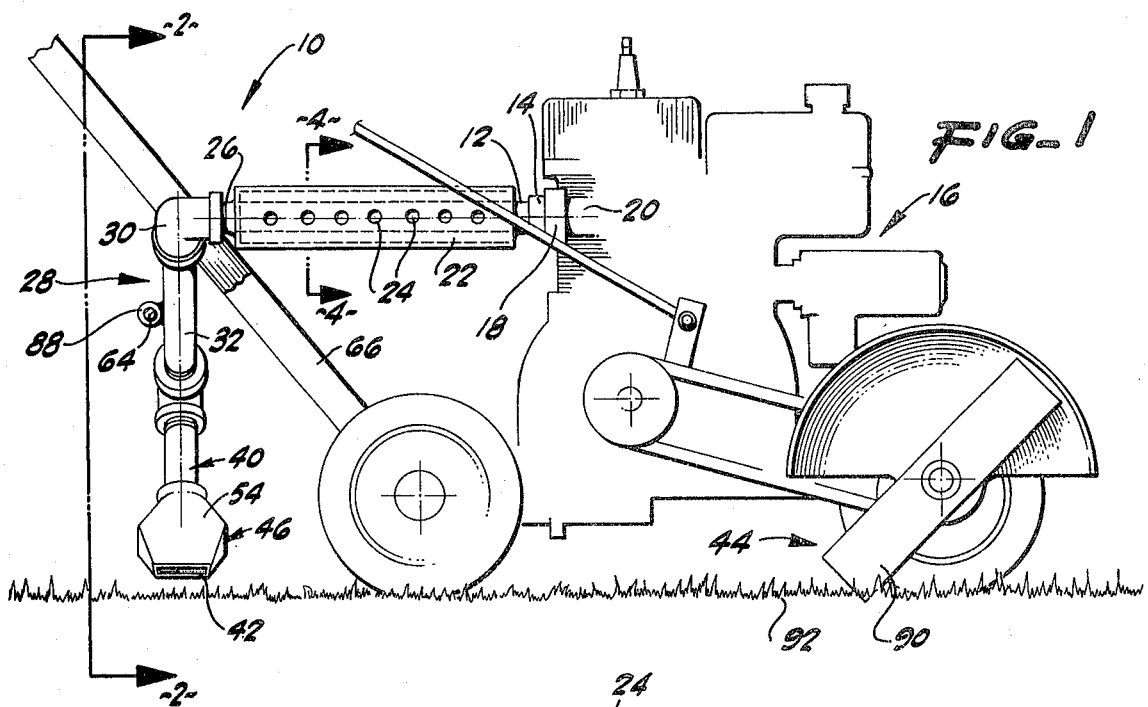
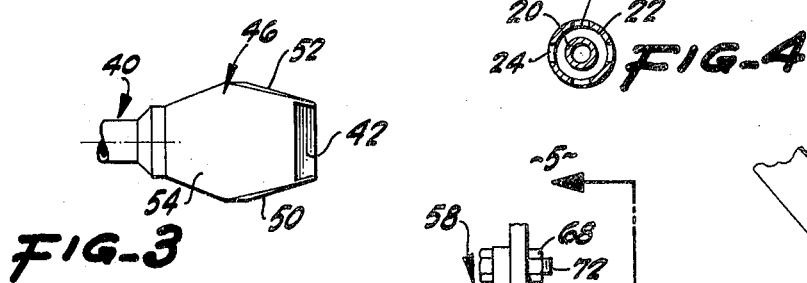
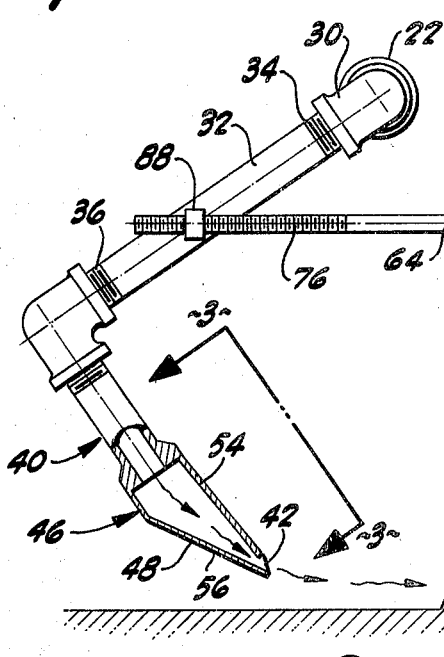
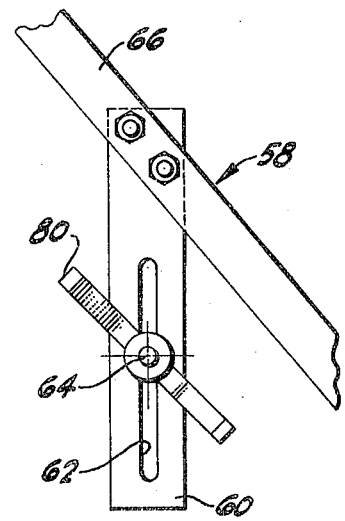

BLOWER FOR EDGER

BACKGROUND OF THE INVENTION

The present invention relates to a novel apparatus for blowing plant cutting from a plant cutting mechanism.

The cutting of plant vegetation necessitates the collecting of the cut plants for further use or disposal. Early implements to perform this function have included the familiar broom, rake, pitch fork, and the like. Machine operated cut vegetation collectors and removers have been developed in certain operations, especially with respect to farming and harvesting of crops. These automatic devices require a large amount of power and complicated and expensive mechanical expedients to obtain the desired results.

More often, in lawn care operations, the task of mowing and edging entails two separate jobs: the cutting and the collecting or moving of the cut vegetation. Of course, two persons or one person performing both jobs sequentially is required.

Blowers have been used to move and/or dispose of cut vegetation. Prior devices have been of self contained design, hand held, or supported at least in part on the back of a worker. Blowers of this type have been employed after the cutting operation, thus requiring compound work to complete the entire operation of cutting and cleaning and the like of the cut vegetation.

SUMMARY OF THE INVENTION

A blower apparatus for a plant cutter is provided having a hollow member affixed to conduct exhaust gases from the plant cutter, which may be of any type producing such exhaust gases, such as but not limited to, diesel powered, gasoline powered, and like powered cutters.

The hollow member may be muffled by a muffling means which generally surrounds at least a portion of said hollow member, leaving unobstructed said hollow member's interior. Connected to the hollow member is a rotatable hollow member, the rotation being about the connection of the hollow member and rotatable hollow member.

Rotation of the rotatable hollow member adjusts the distance between a terminal opening in the rotatable hollow member and the cut vegetation resulting from the cutting mechanism. In the case of an edger, the cut vegetation will pile in an elongated mound behind the edger. Exhaust gases from the cutter travel through the hollow member and the rotatable hollow member, through the terminal opening, to blow the cut vegetation away from the cutter.

The terminal opening may be constructed as part of a nozzle which connects to the end of the rotatable hollow member. The nozzle designally causes the exhaust gases to converge after leaving the same and may be formed of at least two pairs of opposed sides, each pair of sides lying in intersecting planes. The sides of the nozzle converge toward the terminal opening of the device.

In addition, the rotatable hollow member may have an adjustable support means to determine the degree of rotation of the same, and thus the distance between the terminal opening and the cut vegetation. Such support means may include a slotted bracket affixed to a portion of the cutter and an elongate member which has a threaded end portion. The elongated member adjustably fits within the slot and the threaded portion engages an internally threaded member which is affixed to the rotatable member. Thus, the rotation of the rotatable member easily and quickly changes the desired distance between the terminal opening and the cut vegetation.

It is therefore an object of the present invention to provide an apparatus for blowing cut vegetation away from a plant cutter by utilizing the exhaust gases of the cutter.

It is another object of the present invention to provide a device which will permit a lawn edger to dispose of the cut lawn vegetation for use as mulch, compost, and the like which is operable by one person.

It is yet another object of the present invention to provide a glower for a lawn cutter which adjusts its capacity to blow the cut lawn vegetation depending on the characteristic of the cut vegetation such as moisture, fineness and the like.

Another object of the present invention is to provide an apparatus which quickly and efficiently disposes of the cut vegetation from lawn edger and the like and which possesses noise suppression qualities.

The invention possesses other objects and advantages especially as concerns particular features and characteristics thereof which will become apparent as the specification continues.

BRIEF DESCRIPTION OF THE DRAWINGS

FIG. 1 is a side elevational view of the device in use with a typical lawn edger.

FIG. 2 is a partially broken view taken along line 2—2 of FIG. 1.

FIG. 3 is a partially broken view taken along line 3—3 of FIG. 2.

FIG. 4 is a sectional view taken along line 4—4 of FIG. 1.

FIG. 5 is a partially broken view taken along line 5—5 of FIG. 2.

DESCRIPTION OF THE PREFERRED EMBODIMENT

The invention in its entirety is depicted by reference character 10 and includes a hollow member 12 affixed to the exhaust port 14 of lawn cutter 16. Lawn cutter 16 is depicted as a conventional edger but may be a variety of plant cutting devices where the cut vegetation and the like gathers behind the cutting mechanism of the vehicle. The cutter 16 employs an internal combustion engine but is not limited to such an engine as long as exhaust gases exit therefrom. For example, cutter 16 may produce exhaust gases from a cooling system, for an electrically powered motor.

Hollow member 12 affixes to exhaust port 14 in any conventional manner. As shown in FIG. 1, the hollow member 12 threadingly engages adaptor 18 which integrally connects to exhaust pipe 20 on lawn cutter 16. Muffling means 22, at least partially disposed about the exterior portion of hollow member 12, serves to reduce the normal noise of the exhaust gases spewing from exhaust port 14. Muffling means 22 and hollow member 12 may be formed of metallic material but any relatively rigid heat resistant material will suffice. A plurality of opening 24 prevent vibrational strain on muffling means 22 while operating, FIG. 4. Muffling means 22 welds to hollow member 12 on either end of muffling means 22, in the preferred embodiment, but other methods may be employed to produce such disposition.

The hollow member 12 terminates on one end in threaded portion 26. A rotatable hollow member 28 communicates to hollow member 12 via an internally threaded elbow 30. Straight section 32, having threaded portions 34 and 36, engages elbows 30 and 38 respectively. Rotatable member 28 pivots, or rotates, about the long axis of hollow member 12 where elbow 30 engages threaded portion 26 of hollow member 12. End portion 40 of member 28, threadingly engageable with elbow 38 culminates in a terminal opening 42, from which the exhaust gases (illustrated by directional arrows) flow. Terminal opening 42 locates behind the cutting mechanism 44 of cutter 16, FIG. 1. The front end of cutter 16 depicted on the right side of FIG. 1.

End portion 40 may include nozzle 46 which causes the gases to converge after expansion. As shown in FIGS. 2 and 3. The nozzle may be constructed with an end portion 48 that has a pair of opposed sides 50 and 52 and pair of opposed sides 54 and 56. Sides 50 and 52 lie in intersecting planes. Likewise, sides 54 and 56 lie in intersected planes. Sides 50 and 52 and 54 and 56 converge toward terminal opening 42.

The apparatus may be furnished with adjustable support means 58, FIGS. 2 and 5, which embraces, as one of its elements, a slotted bracket 60 having slot 62. Bracket 60 affixes to a portion of the cutter 16; shown to affix to cutter handle 66 in FIG. 5. Fastening means such as nuts 68 and 70 and bolts 72 and 74 provide such affixation. Elongated member 64, having threaded portions 76 and 78, fits within slot 62 and may slide within the slot 62. The slide of member 64 within slot 62 arrests with the tightening of wing nut 80, internally threaded to engage threaded portion 78. Nut 82 and washers 84 and 86 insure against slippage of member 64 within slot 62. Nut 88, internally threaded to engage threaded portion 76, attaches to rotatable hollow member 28 by any suitable means, such as spot welding.

In operation, the cutting mechanism 44 of cutter 16, which includes blade 90, edges lawn 92 adjacent vegetation free area 94. Mounds of cut vegetation 96 gather behind the blade 90, and form mounds or piles 96 which may be elongated and continuous when cutter 16 moves in a forward direction. Exhaust gases from the cutter 16 pass through the apparatus 10 and blow the cut vegetation 96 back unto lawn 92 where it may serve as mulch or compost.

The apparatus 10 may be adjusted such that the distance between mound 96 and terminal opening may decrease or increase. When the cut vegetation 96 is wet or bulky the terminal opening 42 should be moved closer to cut vegetation 96 and vica versa. As an example, it has been found that this distance will vary between 8 and 17 centimeters for normal Northern California lawns.

Whie in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A blower apparatus for an exhaust gas producing plant cutter comprising:

a. hollow member affixed to conduit exhaust gases from the plant cutter;
   b. rotatable hollow member communicating with said hollow member said rotatable hollow member having an end portion culminating in a terminal opening behind the cutting mechanism of the plant cutter, the rotation of said rotatable hollow member adjusting the distance betwen said terminal opening and the cut vegetation resulting from the cutting mechanism of the plant cutter, such that exhaust gases from the cutter pass through said hollow member, rotatable hollow member, and terminal opening, said distance adjustment varying the ability of the exhaust gases to blow the plant cuttings;
   c. adjustable support means for positioning said rotatable hollow member against the forces of gravity and reaction force exerted by the exhaust gases, said adjustable support means comprising a slotted bracket affixed to a portion of the plant cutter; an elongated member fitting within said slot and movable along the length of said slot; means for holding said elongated member to said rotatable member and means for fixing said elongated member to said slotted bracket.

2. The apparatus of claim 1 which additionally comprises muffling means for reducing the noise of the exhaust gases of the lawn cutter; said muffling means at least partially disposed about the exterior of a portion of said hollow member.

3. The apparatus of claim 1 in which said end portion of said rotatable member includes a converging nozzle, said terminal opening being the nozzle opening.

4. The apparatus of claim 3 which additionally comprises muffling means for reducing the noise of the exhaust gases of the lawn cutter; said muffling means at least partially disposed about the exterior of a portion of said hollow member.

5. The apparatus of claim 3 in which said nozzle has an end portion of two pairs of opposed sides, each pair of said sides lying in intersecting planes with respect to each other, sure that each pair of sides converges toward said terminal opening.

6. The apparatus of claim 3 in which said means for fixing said elongated member to said slotted bracket includes a pair of internally threaded members threadingly engaging a first threaded portion of said elongated member, said pair of threaded members placed on opposite sides of said slotted bracket; and said means for holding said elongated member to said rotatable hollow member comprises a third internally threaded member threadingly engaging a second threaded portion of said elongated member, said third internally threaded member affixed to said rotatable hollow member.

7. The apparatus of claim 1 in which said means for fixing said elongated member to said slotted bracket includes a pair of internally threaded members threadingly engaging a first threaded portion of said elongated member, said pair of threaded members placed on opposite sides of said slotted bracket; and said means for holding said elongated member to said rotatable hollow member comprises a third internally threaded member threadingly engaging a second threaded portion of said elongated member, said third internally threaded member affixed to said rotatable hollow member.

* * * * *